United States Patent
Bader et al.

(10) Patent No.: US 11,669,676 B2
(45) Date of Patent: *Jun. 6, 2023

(54) COMPARING SIMILAR APPLICATIONS WITH REDIRECTION TO A NEW WEB PAGE

(71) Applicant: International Business Machines Corporation, Armonk, NY (US)

(72) Inventors: Edward L. Bader, Los Angeles, CA (US); Nehemiah E. Clark, Los Angeles, CA (US); Bryan V. Pham, Temple City, CA (US); Ruben Salazar, Jr., Downey, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 15/852,626

(22) Filed: Dec. 22, 2017

(65) Prior Publication Data

US 2018/0143953 A1    May 24, 2018

Related U.S. Application Data

(63) Continuation of application No. 15/360,809, filed on Nov. 23, 2016.

(51) Int. Cl.
  *G06F 40/14* (2020.01)
  *G06F 16/951* (2019.01)
  *G06F 16/22* (2019.01)

(52) U.S. Cl.
  CPC .......... *G06F 40/14* (2020.01); *G06F 16/2282* (2019.01); *G06F 16/951* (2019.01)

(58) Field of Classification Search
  CPC ............ G06F 17/2247; G06F 3/04817; G06F 17/30339; G06F 17/30864; G06F 9/44536;
  (Continued)

(56) References Cited

U.S. PATENT DOCUMENTS

| 5,165,024 A | 11/1992 | Sweazey |
| 5,572,643 A | 11/1996 | Judson |
(Continued)

FOREIGN PATENT DOCUMENTS

| TW | I606356 B | * 12/2014 | ............. G06F 17/50 |
| WO | 2000073958 | 12/2000 | |

OTHER PUBLICATIONS

Comparison of antivirus software from Wikipedia (Nov. 2, 2016—extracted from web.archive.org—https://web.archive.org/web/20161107001622/https://en.wikipedia.org/wiki/Comparison-of_antivirus_software) (Year: 2016).*

(Continued)

*Primary Examiner* — Mohamed Abou El Seoud
*Assistant Examiner* — Koorosh Nehchiri
(74) *Attorney, Agent, or Firm* — Konrad Raynes Davda & Victor LLP; Janaki K. Davda

(57) ABSTRACT

Provided are techniques for comparing similar applications. A feature is identified from a linkage table, wherein the linkage table comprises a link to first information and a link to second information describing the feature, wherein the first information is for a first application and the second information is for a second application. There is redirection from a first web page to a second web page in a Graphical User Interface (GUI) with a first window in the second web page displaying the first information and a second window in the second web page displaying the second information.

6 Claims, 9 Drawing Sheets

(58) Field of Classification Search
CPC .. G06F 8/71; G06F 8/65; G06F 8/658; G06Q 30/0643; G06Q 30/0629; G06Q 30/0621
USPC ......................................................... 715/760
See application file for complete search history.

(56) References Cited

U.S. PATENT DOCUMENTS

| | | | |
|---|---|---|---|
| 5,771,354 A | 6/1998 | Crawford | |
| 6,021,426 A | 2/2000 | Douglis et al. | |
| 6,367,077 B1* | 4/2002 | Brodersen | G06F 8/65 717/170 |
| 6,584,300 B2 | 6/2003 | Lengua | |
| 6,820,259 B1 | 11/2004 | Kawamata et al. | |
| 6,904,588 B2 | 6/2005 | Reddy et al. | |
| 6,985,448 B2 | 1/2006 | Yagyu et al. | |
| 7,071,934 B1* | 7/2006 | Faoro | G06F 8/71 715/229 |
| 7,130,821 B1* | 10/2006 | Connors | G06Q 30/00 705/26.5 |
| 7,143,366 B1* | 11/2006 | McKelvey | G05B 19/056 715/234 |
| 7,366,709 B2 | 4/2008 | Nevin et al. | |
| 7,418,532 B2 | 8/2008 | Suzuki et al. | |
| 7,418,657 B2 | 8/2008 | Gorelick et al. | |
| 7,432,926 B1 | 10/2008 | Cherkas | |
| 7,472,166 B1 | 12/2008 | Davis | |
| 7,487,345 B2 | 2/2009 | Khatri et al. | |
| 7,506,257 B1* | 3/2009 | Chavez | G06F 8/65 714/37 |
| 7,603,382 B2 | 10/2009 | Halt, Jr. | |
| 7,680,703 B1* | 3/2010 | Smith | G06Q 30/06 705/26.8 |
| 7,702,867 B2 | 4/2010 | Coombs et al. | |
| 8,214,802 B1 | 7/2012 | Graves | |
| 8,234,183 B2* | 7/2012 | Smith | G06Q 30/0643 705/26.64 |
| 8,260,747 B2 | 9/2012 | Wu et al. | |
| 8,280,981 B2 | 10/2012 | Olliphant | |
| 8,380,588 B2 | 2/2013 | Batra et al. | |
| 8,666,593 B2 | 3/2014 | Yamada | |
| 8,671,017 B2 | 3/2014 | Trossen | |
| 8,751,601 B2 | 6/2014 | Edge et al. | |
| 8,924,858 B2 | 12/2014 | Mistry et al. | |
| 9,122,657 B2 | 9/2015 | Bleakley et al. | |
| 9,167,419 B2 | 10/2015 | Harrison | |
| 2001/0029459 A1 | 10/2001 | Fujiwara | |
| 2002/0091993 A1* | 7/2002 | Walley | G06F 9/453 717/120 |
| 2002/0120648 A1* | 8/2002 | Ball | G06F 16/957 715/234 |
| 2003/0001875 A1* | 1/2003 | Black | G06F 9/453 715/708 |
| 2003/0202012 A1* | 10/2003 | Kemp | G06F 8/71 715/762 |
| 2005/0204298 A1* | 9/2005 | Kemp | G06F 8/71 715/762 |
| 2006/0161895 A1* | 7/2006 | Speeter | G06F 8/71 717/121 |
| 2010/0131313 A1* | 5/2010 | Hansknecht | G06Q 10/02 705/7.11 |
| 2010/0223260 A1* | 9/2010 | Wu | G06F 16/9574 707/723 |
| 2011/0035371 A1* | 2/2011 | Pong | G06F 17/30557 707/722 |
| 2011/0119161 A1* | 5/2011 | Van Treeck | G06Q 30/02 705/27.2 |
| 2011/0296380 A1* | 12/2011 | Dvinov | G06F 8/71 717/122 |
| 2012/0047146 A1* | 2/2012 | Balakrishnan | G06F 17/30716 707/748 |
| 2012/0084261 A1 | 4/2012 | Parab | |
| 2012/0089914 A1* | 4/2012 | Holt | G06F 3/0485 715/728 |
| 2012/0131566 A1 | 5/2012 | Morgan et al. | |
| 2012/0297365 A1* | 11/2012 | Altin | G06F 9/4493 717/124 |
| 2013/0097585 A1* | 4/2013 | Jentsch | G06F 8/71 717/122 |
| 2013/0142363 A1 | 6/2013 | Amento et al. | |
| 2013/0159851 A1 | 6/2013 | Pawar et al. | |
| 2013/0275943 A1* | 10/2013 | Namjoshi | G06F 8/75 717/122 |
| 2013/0311335 A1 | 11/2013 | Howard et al. | |
| 2014/0006922 A1 | 1/2014 | Smith et al. | |
| 2014/0033123 A1* | 1/2014 | Hockmann | G06F 8/65 715/810 |
| 2014/0075358 A1* | 3/2014 | Barros | G06F 3/0484 715/771 |
| 2014/0245287 A1 | 8/2014 | Enokizono | |
| 2014/0282395 A1* | 9/2014 | Wang | G06F 8/71 717/120 |
| 2014/0337304 A1 | 11/2014 | Sayers et al. | |
| 2014/0372980 A1* | 12/2014 | Verma | G06F 9/4451 717/121 |
| 2015/0046286 A1 | 2/2015 | Erb et al. | |
| 2015/0154164 A1* | 6/2015 | Goldstein | G06F 40/106 715/229 |
| 2015/0169759 A1 | 6/2015 | Ronen et al. | |
| 2015/0186128 A1 | 7/2015 | Patton et al. | |
| 2015/0205621 A1 | 7/2015 | Kading | |
| 2015/0212995 A1 | 7/2015 | Massand | |
| 2015/0261518 A1* | 9/2015 | Viswanathan | G06F 8/71 717/168 |
| 2015/0302182 A1 | 10/2015 | Wyatt et al. | |
| 2015/0309990 A1* | 10/2015 | Allen | G06F 17/2785 704/9 |
| 2015/0339386 A1 | 11/2015 | Yang et al. | |
| 2016/0012318 A1 | 1/2016 | Bilenko et al. | |
| 2016/0021174 A1 | 1/2016 | De Los Santos Vilchez et al. | |
| 2016/0055196 A1* | 2/2016 | Collins | G06F 40/197 707/690 |
| 2016/0098340 A1* | 4/2016 | Weaver | G06F 11/3608 714/38.1 |
| 2016/0132324 A1* | 5/2016 | Elder | G06F 8/71 717/170 |
| 2016/0132325 A1* | 5/2016 | Elder | G06F 8/71 717/122 |
| 2016/0291802 A1* | 10/2016 | Beck | G06F 9/451 |
| 2017/0177330 A1* | 6/2017 | Yu | G06F 8/71 |
| 2017/0192873 A1* | 7/2017 | Ozdemir | G06F 8/71 |

OTHER PUBLICATIONS ip.com, "Method and System for Providing a Comparison Shopping Feature on a Toolbar Shopping Application", Electronic Publication Date: Oct. 29, 2015, Copyright: Yahoo! 2015, can be retrieved from the Internet at <URL: http://ip.com/IPCOM/000243939>, Total 3 pp.

McMillan, C., M. Grechanik, and D. Poshyvanyk, "Detecting Similar Software Applications", © 2012 IEEE, ICSE IEEE 34th International Conference on Software Engineering, Jun. 2-9, 2012, pp. 364-374, Total 11 pp.

Mell, P. and T. Grange, "The NIST Definition of Cloud Computing (Draft)", Sep. 2011, Computer Security Division Information Technology Laboratory National Institute of Standards and Technology, Total 7 pp.

Mell, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Ramesh, V., C. Hsu, M. Agrawala, and B. Hartmann, "ShowMeHow: Translating User Interface Instructions Between Similar Applications", UIST'11, Oct. 16-19, 2011, Santa Barbara, CA, USA, Copyright 2011 ACM, UIST'11 24th Annual ACM Symposium, pp. 127-134, Total 8 pp.

ip.com, "Method and System for Embedding Assistance into Interactive Samples", Dec. 5, 2008, IPCOM000177231D, retrieved from the Internet at <URL: IP.com at:http://ip.com/IPCOM/000177231> Total 4 pp.

(56) References Cited

OTHER PUBLICATIONS

Preliminary Amendment, Dec. 22, 2017, for U.S. Appl. No. 15/360,809, filed Nov. 23, 2016 by E.L. Bader et al., Total 5 pp. [57.378 (PrelimAmend)].

U.S. Patent Application with U.S. Appl. No. 15/360,809, filed Nov. 23, 2016, entitled "Comparing Similar Applications With Redirection to a New Web Page", invented by E.L. Bader et al., Total 33 pp. [57.378 (Appln)].

List of IBM Patents or Patent Applications Treated as Related, Dec. 22, 2017, Total 2 pp.

Response to Office Action 3 for U.S. Appl. No. 15/360,809, 10 pp., dated Nov. 25, 2019. [57.378 (ROA3)].

Final Office Action 2 for U.S. Appl. No. 15/360,809, 22 pp., dated Mar. 6, 2020. [57.378 (FOA2)].

Response to Final Office Action 2 for U.S. Appl. No. 15/360,809, 12 pp., dated Jun. 5, 2020. [57.378 (RFOA2)].

Office Action 5 for U.S. Appl. No. 15/360,809, 20 pp., dated Dec. 28, 2020. [57.378 (OA5)].

Response to Office Action 5 for U.S. Appl. No. 15/360,809, 13 pp., dated Mar. 25, 2021. [57.378 (ROA5)].

Final Office Action 3 for U.S. Appl. No. 15/360,809, 23 pp., dated Jul. 15, 2021. [57.378 (FOA3)].

Response to Final Office Action 3 for U.S. Appl. No. 15/360,809, 12 pp., dated Oct. 15, 2021. [57.378 (RFOA3)].

Office Action 7 for U.S. Appl. No. 15/360,809, 21 pp., dated Nov. 29, 2021. [57.378 (OA7)].

Response to Office Action 7 for U.S. Appl. No. 15/360,809, 11 pp., dated Feb. 16, 2022. [57.378 (ROA7)].

Final Office Action dated Mar. 10, 2022, pp. 21, for U.S. Appl. No. 15/360,809, (57.378).

Response to Final Office Action dated May 9, 2022, pp. 12, for U.S. Appl. No. 15/360,809, (57.378).

Office Action 1 for U.S. Appl. No. 15/360,809, 24 pp., dated Sep. 6, 2018.

Response to Office Action 1 for U.S. Appl. No. 15/360,809, 14 pp., dated Dec. 6, 2018.

Final Office Action 1 for U.S. Appl. No. 15/360,809, 12 pp., dated Apr. 5, 2019.

Response to Final Office Action 1 for U.S. Appl. No. 15/360,809, 10 pp., dated Aug. 2, 2019.

Office Action 3 for U.S. Appl. No. 15/360,809, 13 pp., dated Aug. 23, 2019.

Notice of Allowance dated Feb. 27, 2023, 10 pp., for U.S. Appl. No. 15/360,809.

* cited by examiner

| Feature Identifier | First Application Feature Link | Second Application Feature Link |
|---|---|---|
| HelpLink001 | Help topic 17 | Help topic 07 |
| HelpLink002 | Help topic 23 | Help topic 13 |
| HelpLink003 | Help topic 37 | Not available |
| HelpLink004 | Help topic 07 | Help topic 03 |
| HelpLink005 | Not available | Help topic 31 |
| HelpLink006 | Not available | Not available |

FIG. 3

COMPARING SIMILAR APPLICATIONS WITH REDIRECTION TO A NEW WEB PAGE

FIELD

Embodiments of the invention relate to comparing similar applications with redirection to a new web page. In particular, embodiments of the invention relate to the use of online help to compare similar applications.

BACKGROUND

Many customers want to understand specific feature comparison between an existing, installed application and a newer application. An example of this is the customer who is considering moving from a first content management application to a newer content management application. The customers would like to understand whether their daily operations can be completed on the new application.

SUMMARY

Provided is a method for comparing similar applications. The method comprises: identifying, using a processor of a computer, a feature from a linkage table, wherein the linkage table comprises a link to first information and a link to second information describing the feature, wherein the first information is for a first application and the second information is for a second application; and redirecting from a first web page to a second web page in a Graphical User Interface (GUI) with a first window in the second web page displaying the first information and a second window in the second web page displaying the second information.

Provided is a computer program product for comparing similar applications. The computer program product comprises a computer readable storage medium having program code embodied therewith, the program code executable by at least one processor to perform identifying a feature from a linkage table, wherein the linkage table comprises a link to first information and a link to second information describing the feature, wherein the first information is for a first application and the second information is for a second application; and redirecting from a first web page to a second web page in a Graphical User Interface (GUI) with a first window in the second web page displaying the first information and a second window in the second web page displaying the second information.

Provided is a computer system for comparing similar applications. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: identifying a feature from a linkage table, wherein the linkage table comprises a link to first information and a link to second information describing the feature, wherein the first information is for a first application and the second information is for a second application; and redirecting from a first web page to a second web page in a Graphical User Interface (GUI) with a first window in the second web page displaying the first information and a second window in the second web page displaying the second information.

BRIEF DESCRIPTION OF THE SEVERAL VIEWS OF THE DRAWINGS

Referring now to the drawings in which like reference numbers represent corresponding parts throughout:

FIG. 3 illustrates an example linkage table in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide the ability to easily compare the product features of two applications in real day-to-day operations, without compromising productivity of the applications, in order to create a smooth transition from the first application to the second application. With embodiments, the first application and the second application are related applications with similar operations or processes. For example, the first application may be an older version, while the second application is a newer version, of a same application. In other embodiments, the first application and the second application are not versions of each other (e.g., they may be provided by different vendors), but they have at least some features that may be compared.

Features include tasks and operations performed by an application.

Figure 1:
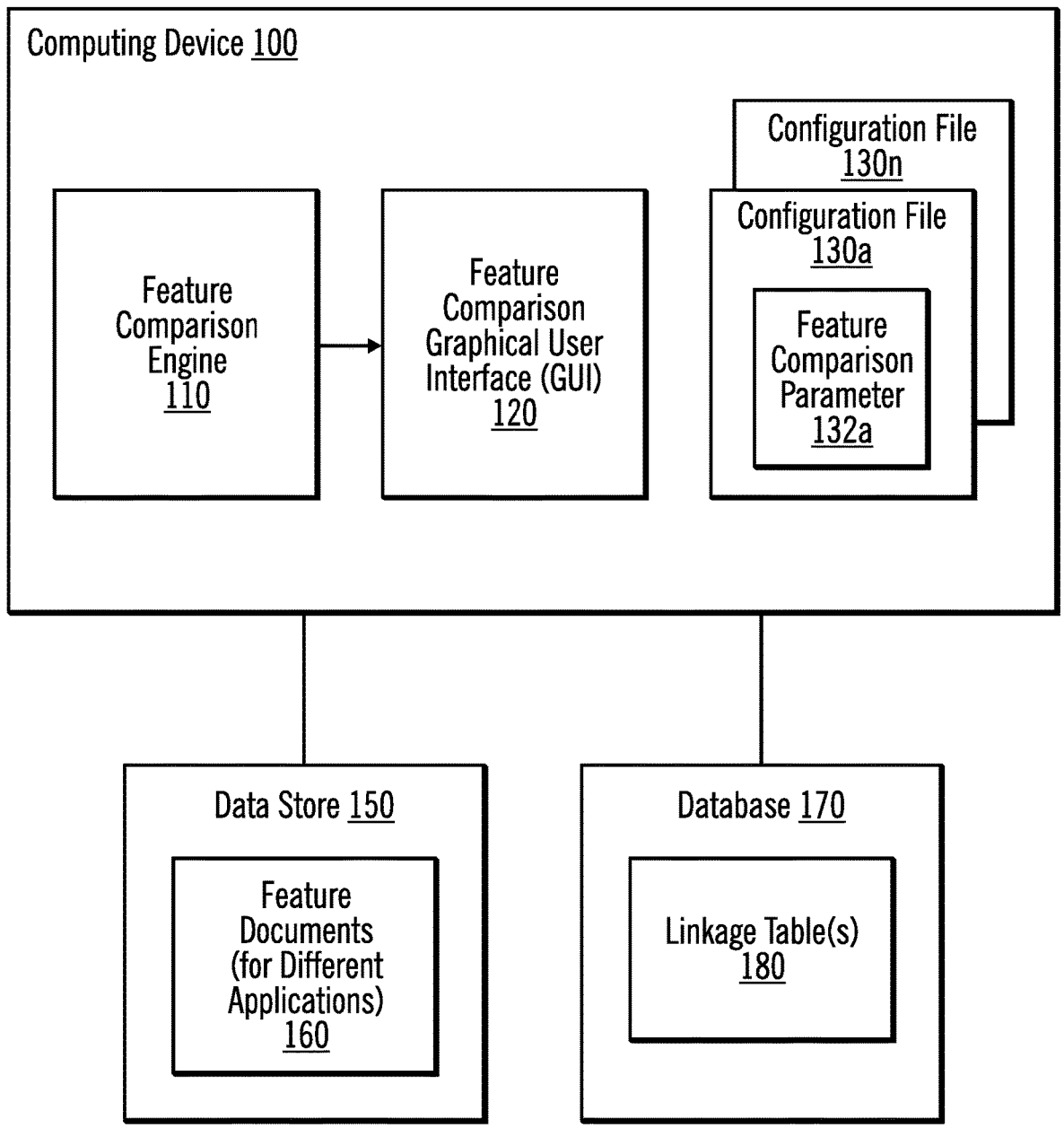
FIG. 1 illustrates, in a block diagram, a computing environment in accordance with certain embodiments.

FIG. 1 illustrates, in a block diagram, a computing environment in accordance with certain embodiments. A computing device 100 is coupled to a data store 150 and to a database 170. The computing device 100 includes a feature comparison engine 110, which generates a Graphical User Interface (GUI) 120. The computing device 100 also includes configuration files 130*a* . . . 130*n*. With embodiments, there is one configuration file 130*a* . . . 130*n* associated with one application. In other embodiments, a group of applications may share a configuration file 130*a* . . . 130*n*. Each configuration file 130*a* . . . 130*n* has a feature comparison parameter (e.g., feature comparison parameter 132*a* for the configuration file 130*a*) that indicates whether feature comparison is to be performed for the associated application. For example, the feature comparison parameter may have a first setting (e.g., "1" or "true") to indicate that feature comparison is to be performed and may have a second setting (e.g., "0" or "false") to indicate that the feature comparison is not to be performed. The configuration file 130 may also include other configuration parameters.

The data store 150 stores feature documents 160 (e.g., with information ("feature information") on how to use features) for different applications (computer programs). The database 170 stores one or more linkage tables 180, and each of the linkage tables 180 links features to the information in the feature documents 160. With embodiments, there may be a linkage table 180 for each pair of applications that may be compared. The GUI 120 displays feature comparisons of the information of a feature for the different applications.

In certain embodiments, in response to a help icon being selected (e.g., being clicked on) in a first web page in a first window, the feature comparison engine 110 opens up a second web page in a second window, within the GUI 120 to illustrate the features of applications side by side.

Merely to better illustrate embodiments of the invention, examples will be provided herein that refer to comparing features, such as for help information, for different applications. However, embodiments are not intended to be limited to help information.

Embodiments provide merged information about a feature for multiple applications.

With embodiments, while viewing information about a first application (e.g., an older application), the user selects (e.g., clicks on) the feature of interest and identifies a second application. Then, the feature comparison engine 110 opens a new Uniform Resource Locator (URL) and displays a new web page with two windows in the GUI 120. The two windows include a first window for first information for the first application and a second window for second information for the second application being compared.

With embodiments, the feature comparison engine 110 opens two windows, side by side, in the GUI 120, and displays comparisons of features (e.g., how to perform a certain task in each application).

With embodiments, the information about a feature is made readily accessible to the user. This will allow the user to compare how the day to day features will behave (or be supported) in the second (e.g., newer) application. The feature comparison engine 110 enables a user to identify a specific feature and be directly taken to a new web page for that feature that compares the feature in two different applications.

Figure 2:
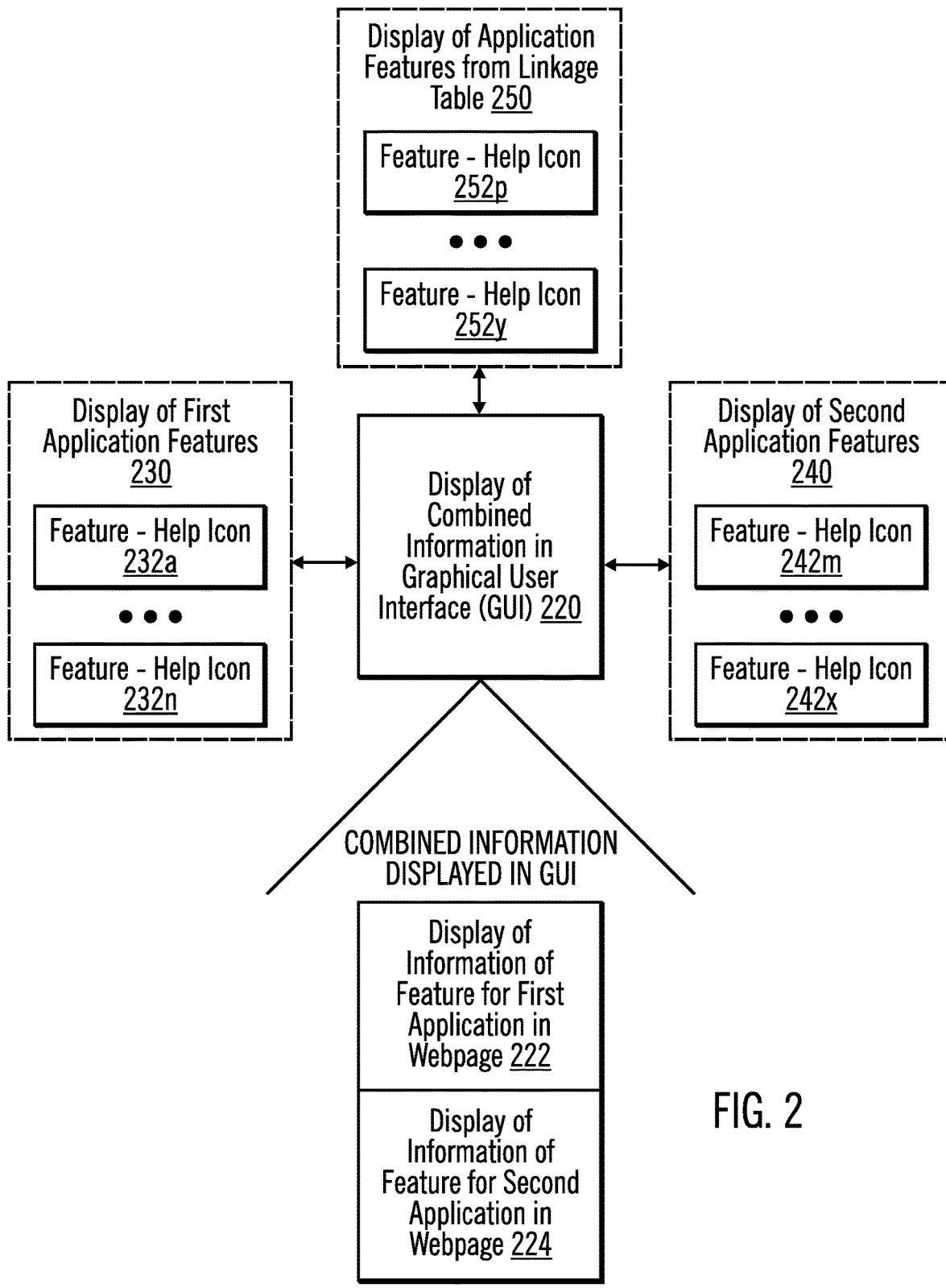
FIG. 2 illustrates, in a block diagram, details of a Graphical User Interface (GUI) in accordance with certain embodiments.

FIG. 2 illustrates, in a block diagram, details of a Graphical User Interface (GUI) 220 in accordance with certain embodiments. The GUI 220 is an example of GUI 120. In FIG. 2, there is a display of first application features 230 in a first web page in a first window, with a help icon 232a . . . 232n associated with each of the first application features. Also, there is a display of second application features 240 in a second web page of a second window with a help icon 242m . . . 242x associated with each of the second application features. Moreover, there is display of application features 250 from a linkage table in a third web page of a third window with a help icon 252p . . . 252y associated with each application feature available (implemented) in the first application and/or the second application. With embodiments, the linkage table may be generated with features of a first application, a second application, and new features not in either the first or second application; then, the application features may be obtained from the linkage table for display in the third web page. The use of letters "a", "n", "m", "p", "x" and "y" is intended to indicate that any number of features may be displayed.

A user may select any one of the help icons 232a . . . 232n while viewing a web page of the first application, may select any one of the help icons 242m . . . 242x while viewing a web page of the second application or may select any one of the help icons 252p . . . 252y while viewing a web page of features generated using the linkage table.

In response to a selection of a particular help icon associated with a feature, the feature comparison engine 120 displays combined information in GUI 220 in a new window. GUI 220 displays information of the feature associated with the selected help icon for a first application in web page 222 in a first window and displays information of the same feature for a second application in web page 224 in a second window. Although the first application web page 222 and the second application web page 224 are illustrated as vertically adjacent, they may be displayed as horizontally adjacent instead.

With embodiments, the user navigates to a help icon (e.g., a help button) that is specific to the feature of interest and selects that help icon. In response to the user selecting (e.g., clicking on) the help icon, the feature compare engine 110 re-routes (redirects) the user to a separate GUI 120 that displays the feature of the first application in a window next to the same feature for a second application in another window. In this manner, the feature comparison engine 110 brings the description of the functionality of the feature side by side.

With embodiments, the information about the feature is specific to the functionality that the users want to execute and may be directly streamed from a knowledge center (a type of data store 150). With embodiments, the knowledge center is a website that lists the documentation for applications that may be compared and that includes instructions on configuration and/or use of certain features. With embodiments, the user is shown a side by side comparison of both the documentation for the new (e.g., second) and old (e.g., first) application.

With embodiments, there is configuration of the system to use comparison functionality. This may be done by setting the feature comparison parameter in the configuration file or by setting a flag in each application that may be compared so that multiple feature documents (for the different applications that may be compared) are loaded.

Embodiments provide a linkage table for each pair of applications to be compared. FIG. 3 illustrates an example linkage table 300 in accordance with certain embodiments. The linkage table 300 is an example of linkage table 180. The linkage table 300 has links to information about features (e.g., in the feature documents 160) of the applications being compared. The linkage table 300 has a column for a feature identifier, a column for a first application feature link that describes the feature (identified by the feature identifier) in the first application, and a column for a second application feature link that describes the feature (identified by the feature identifier) in the second application. The feature identifier is associated with the feature of the selected help icon.

With embodiments, the links may be URLs (hyperlinks), directory addresses, etc. Also, with embodiments, a link for a particular application may indicate that the feature is not available for that application.

Also, the linkage table 300 includes features with feature identifiers HelpLink001, HelpLink002, and HelpLink004, which are available in both the first application and the second application. The linkage table 300 includes a feature with feature identifier HelpLink003, which is available in the first application, but not available in the second application. The linkage table 300 includes a feature with feature identifier HelpLink005, which is available in the second application, but not available in the second application. The linkage table 300 includes a feature with feature identifier HelpLink006, which is not supported in either the first application or the second application.

In certain embodiments, the linkage table 300 includes direct references to pages of documents with the information about a feature for each of the applications in the column for a first application feature link and the column for a second application feature link.

In an example referring to the linkage table 180, the first application is presently installed at a user site. The user is considering purchasing the second application. With embodiments, once the linkage table 180 is loaded and a feature comparison parameter in a configuration file associated with the first application is set to true, the user may perform feature comparison. In certain embodiments, each application has a configuration file. For example, the user may want to evaluate how query results are printed. The user invokes a feature of "help for printing query results". In this example, this feature maps to feature identifier HelpLink002. HelpLink002 is associated with Helptopic 23 for the first application and Helptopic 13 for the second application. The feature comparison engine 110 displays a GUI 120 with the information for Helptopic 23 in a first window and information for Helptopic 13 in a second window. With embodiments, the windows may be horizontally or vertically adjacent.

In a second example, the user may want help for configuring custom objects. The user invokes the feature of "help for configuring custom objects". In this second example, this feature maps to feature identifier HelpLink003. HelpLink003 is associated with Helptopic 37 for the first application and is not associated with a help topic for the second application. The feature comparison engine 110 displays a GUI 120 with information for Helptopic 37 in a first window and an indication that the feature is not available in the second application in a second window. Thus, the user can also learn whether features are available in the second application in this manner.

Figure 4A:
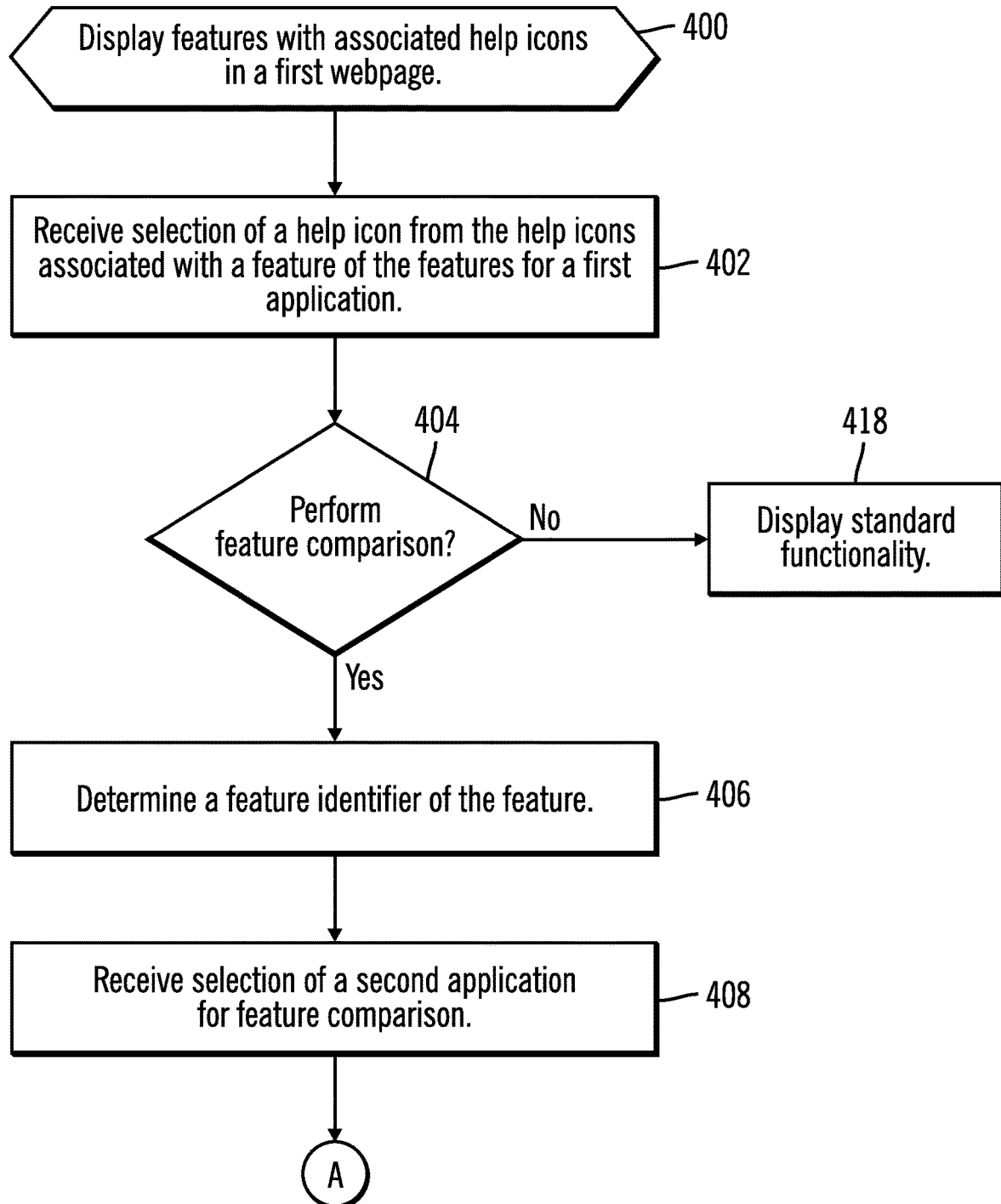
FIGS. 4A and 4B illustrate, in a flow chart, operations for feature comparison in accordance with certain embodiments.
Figure 4B:
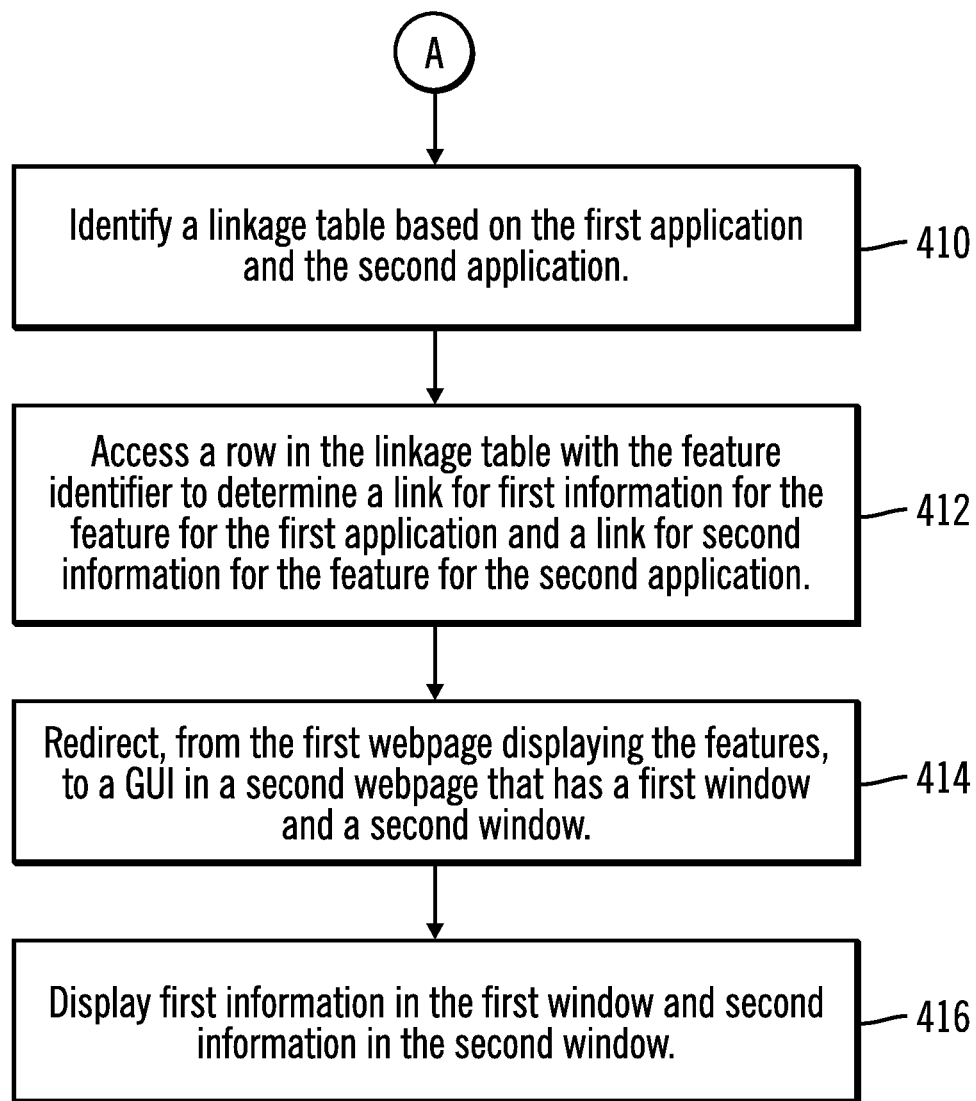

FIGS. 4A and 4B illustrate, in a flow chart, operations for feature comparison in accordance with certain embodiments. Control begins at block 400 with the feature comparison engine 110 displaying features with associated help icons in a first web page. In certain embodiments, each of the help icons is a Help button. In block 402, the feature comparison engine 110 receives selection of a help icon from the help icons associated with a feature from the features for a first application. In block 404, the feature comparison engine 110 determines whether feature comparison is to be performed by evaluating a feature comparison parameter in the configuration file. If so, processing continues to block 406, otherwise, processing continues to block 418.

In block 406, the feature comparison engine 110 determines a feature identifier of the feature. In block 408, the feature comparison engine 110 receives selection of a second application for feature comparison. In certain embodiments, the selection is received via GUI 120 (e.g., the GUI 120 may provide a list of applications from which the second application is selected by a user). From block 408 (FIG. 4A), processing continues to block 410 (FIG. 4B).

In block 410, the feature comparison engine 110 identifies a linkage table based on the first application and the second application. This is done because there may be a linkage table for each pair of applications to be compared.

In block 412, the feature comparison engine 110 accesses a row in the linkage table with the feature identifier to determine a link for first information for the feature for the first application and a link for second information for the feature for the second application.

In block 414, the feature comparison engine 110 redirects, from the first web page displaying the features, to a GUI in a second (new) web page that has a first window and a second window.

In block 416, the feature comparison engine 110 displays first information in the first window and second information in the second window. With embodiments, the first information may indicate that the feature is not available in the first application and/or the second information may indicate that the feature is not available in the second application. Thus, with embodiments, the user is able to determine which features are available or not available in the first application and the second application.

Returning to FIG. 4A, in block 418, the feature comparison engine 110 displays standard functionality (e.g., standard help functionality).

Figure 5:
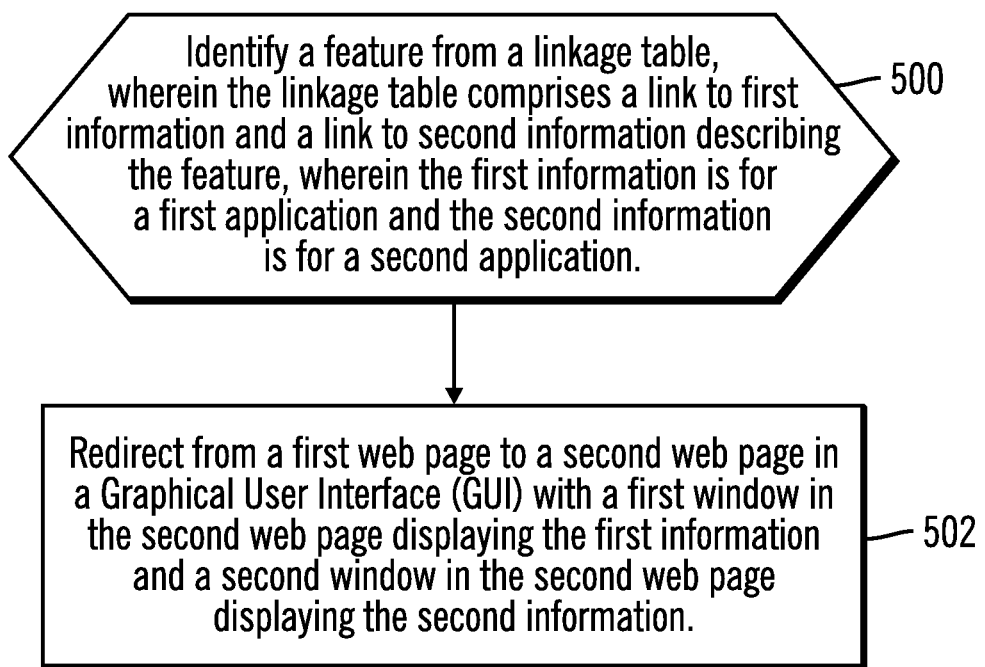
FIG. 5 illustrates, in a flow chart, operations for feature comparison in accordance with certain other embodiments.

FIG. 5 illustrates, in a flow chart, operations for feature comparison in accordance with certain other embodiments. Control begins at block 500 with the feature comparison engine 110 identifying a feature from a linkage table, wherein the linkage table comprises a link to first information and a link to second information describing the feature, wherein the first information is for a first application and the second information is for a second application. In block 502, the feature comparison engine 110 redirects from a first web page to a second web page in a Graphical User Interface (GUI) with a first window in the second web page displaying the first information and a second window in the second web page displaying the second information. With embodiments, the feature is displayed in a list of features in the first web page, such as illustrated with features 230, 240, and 250 of FIG. 2.

Embodiments uniquely serve the purpose of identifying the capability (feature) differences of different versions of an application to accelerate user of the capabilities. Embodiments provide dynamic information about a feature to ensure successful adoption of a newer version of an application or a newer application. Embodiments leverage the existing information on features of applications and deliver self-service or auto-service the adoption and implementation of the applications.

Embodiments compare two similar applications with similar operations and generates a split view so that the user can view operations for a feature from a known application and operations for the same feature from an unfamiliar application. With embodiments, the information about the features may come from various databases and data stores.

Embodiments provide existing information about a feature from both applications in a simple to read and easy to compare side by side representation.

Figure 6:
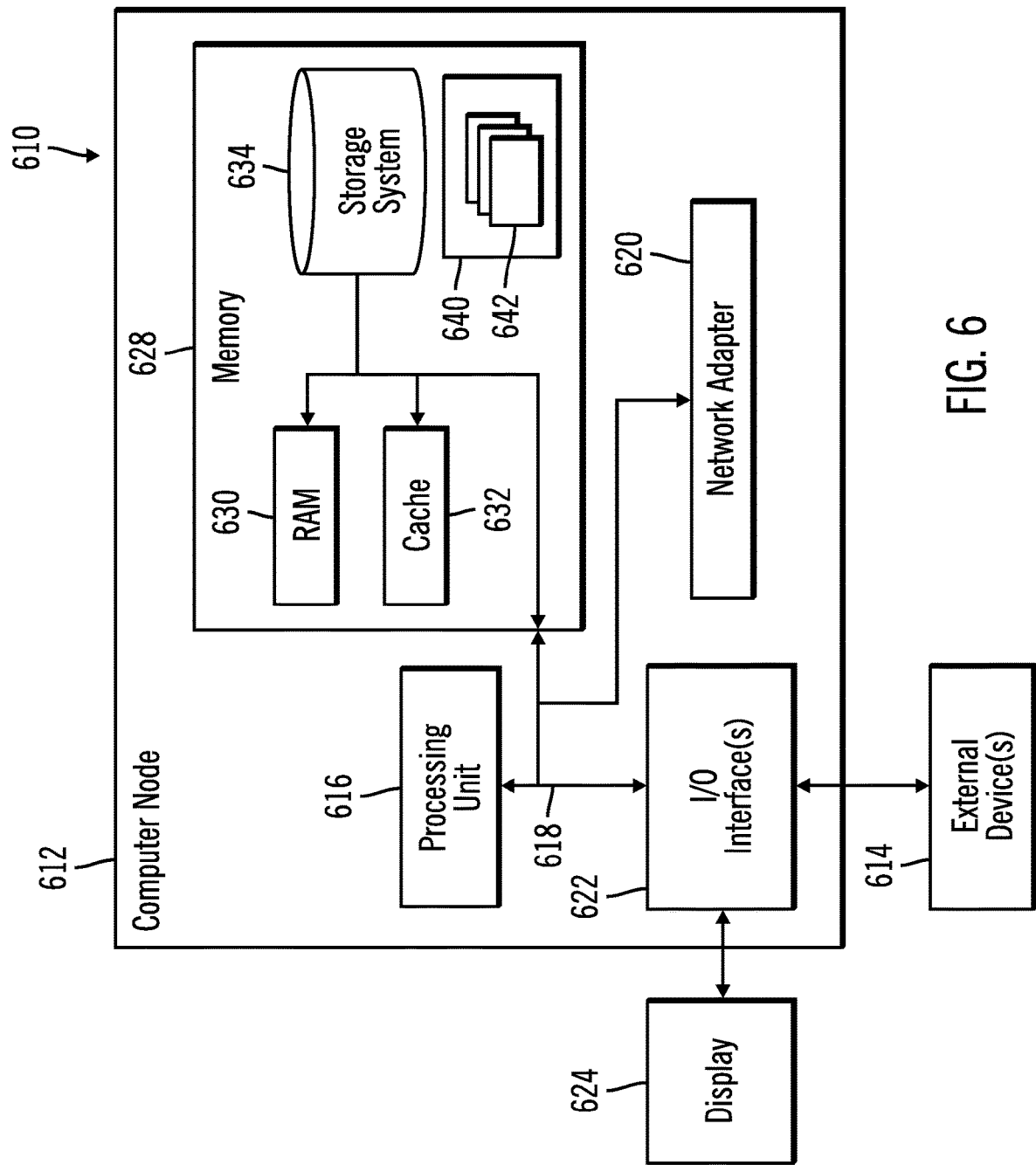
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 in cloud computing node 610 is shown in the form of a general-purpose computing device. The components of computer node 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the computing device 100 has the architecture of computer node 612. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
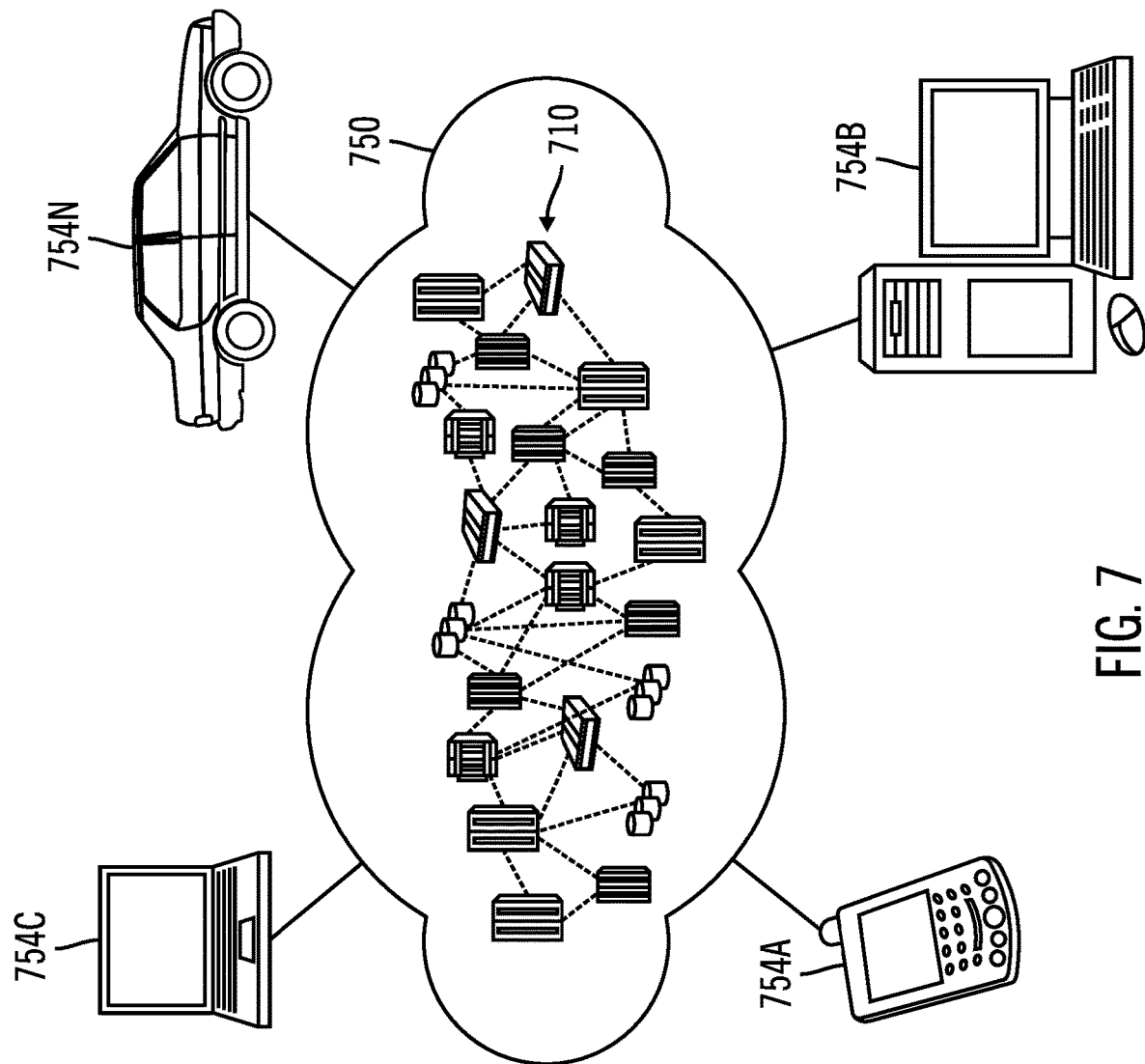
FIG. 7 illustrates a cloud computing environment in accordance with certain embodiments.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
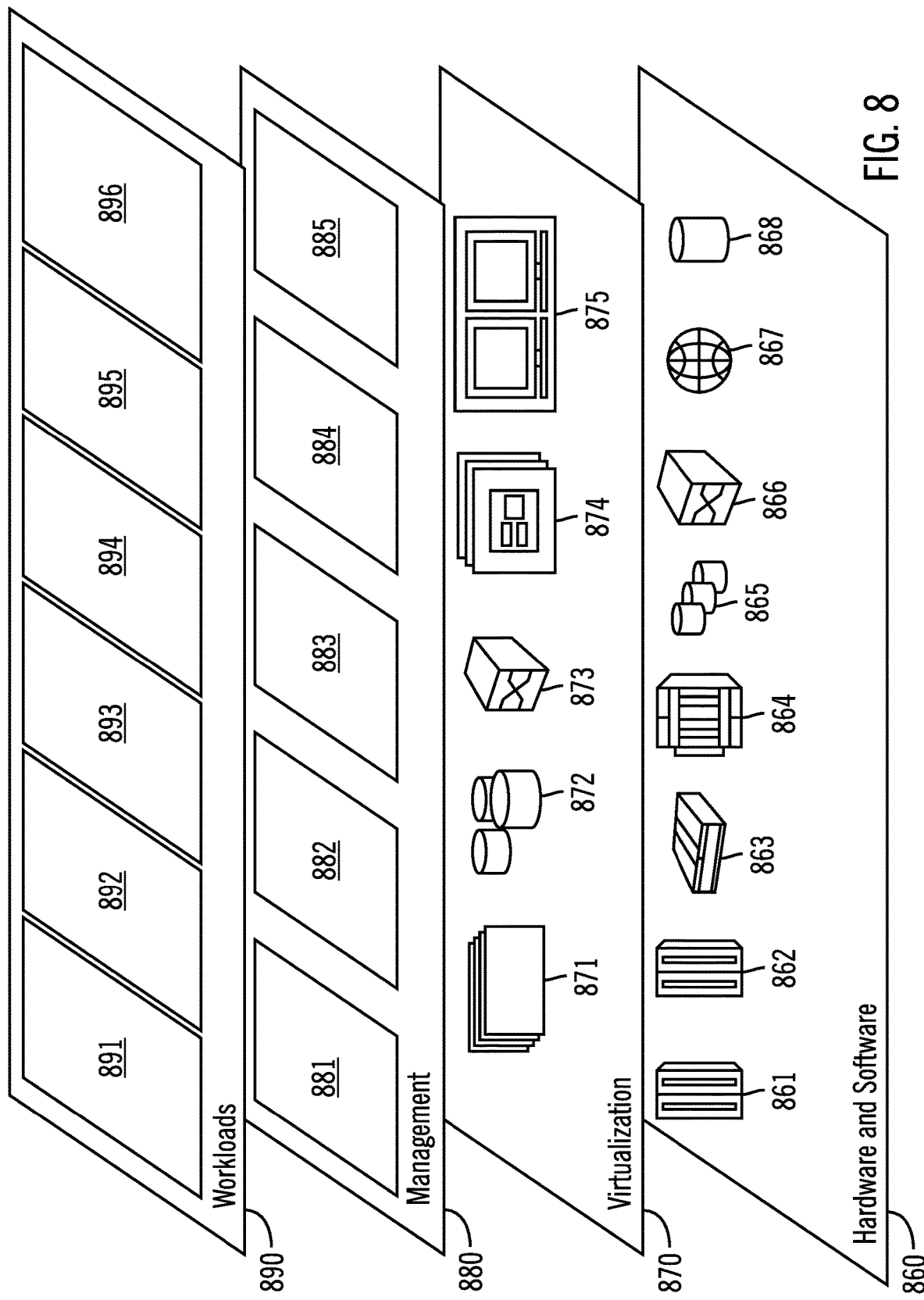
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and feature comparison 896.

Thus, in certain embodiments, software or a program, implementing feature comparison in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
generating a linkage table with a first feature in a first application of a plurality of applications and in a second application of the plurality of applications, a second feature in one of the first application and the second application, and a third feature not in the first application and not in the second application, wherein the linkage table includes a first link to first information and a second link to second information for each of the first feature, the second feature, and the third feature;
receiving a selection of the first application;
receiving a selection of a feature from one of the first feature, the second feature, and the third feature displayed in a first web page; and
in response to a parameter in a file indicating that the first application is to be compared,
receiving a selection of the second application;
identifying the linkage table based on the selection of the first application and the selection of the second application, wherein each pair of applications in the plurality of applications is associated with a different linkage table;
identifying the selected feature in the linkage table; and
redirecting from the first web page to a second web page in a Graphical User Interface (GUI) with a first window in the second web page displaying the first information for the selected feature and a second window in the second web page displaying the second information for the selected feature, wherein, when the selected feature is in the first application, the first information describes the selected feature for the first application, and, when the selected feature is in the second application, the second information describes the selected feature for the second application.

2. The computer-implemented method of claim 1, wherein a help icon is associated with the selected feature.

3. The computer-implemented method of claim 1, wherein the first window is displayed adjacent to the second window to enable comparison of the first information and the second information.

4. The computer-implemented method of claim 1, wherein, when the selected feature is not in the first application, the first information indicates that the selected feature is not in the first application, and when the selected feature is not in the second application, the second information indicates that the selected feature is not in the second application.

5. The computer-implemented method of claim 1, wherein a Software as a Service (SaaS) is configured to perform the operations of the computer-implemented method.

6. The computer-implemented method of claim 1, wherein the linkage table is stored in a database, wherein the first link provides access to the first information in a first feature document, and wherein the second link provides access to the second information in a second feature document.

\* \* \* \* \*